United States Patent
Kinoshita et al.

(10) Patent No.: US 10,464,312 B2
(45) Date of Patent: Nov. 5, 2019

(54) CURING METHOD AND CURING SYSTEM

(71) Applicant: IWASAKI ELECTRIC CO., LTD., Tokyo (JP)

(72) Inventors: Shinobu Kinoshita, Gyoda (JP); Ryoji Fujimori, Tokyo (JP)

(73) Assignee: IWASAKI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/073,236

(22) PCT Filed: Jan. 18, 2017

(86) PCT No.: PCT/JP2017/001584
§ 371 (c)(1),
(2) Date: Jul. 26, 2018

(87) PCT Pub. No.: WO2017/130819
PCT Pub. Date: Aug. 3, 2017

(65) Prior Publication Data
US 2019/0039372 A1    Feb. 7, 2019

(30) Foreign Application Priority Data
Jan. 27, 2016 (JP) ................................ 2016-013598

(51) Int. Cl.
*B41J 2/01* (2006.01)
*B41J 11/00* (2006.01)
(Continued)

(52) U.S. Cl.
CPC ............. *B41J 2/01* (2013.01); *B01J 19/085* (2013.01); *B01J 19/123* (2013.01); *B41J 11/002* (2013.01);
(Continued)

(58) Field of Classification Search
CPC ...... B41J 2/01; B41J 11/002; B41J 2002/012; C09D 11/101; C09D 11/322; C08F 2/54
See application file for complete search history.

(56) References Cited

U.S. PATENT DOCUMENTS 3,918,393 A    11/1975 Hahn
4,057,657 A    11/1977 Garnett et al.
(Continued)

FOREIGN PATENT DOCUMENTS

JP    48-03628 A    5/1973
JP    48-036282 A    5/1973
(Continued)

OTHER PUBLICATIONS

Office Action dated Sep. 19, 2017 for the corresponding Japanese Patent Application No. 2016-013598.
(Continued)

*Primary Examiner* — Anh T Vo
(74) *Attorney, Agent, or Firm* — Leason Ellis LLP

(57) ABSTRACT

An electron-beam-curing resin or a photocurable resin not containing a photopolymerization initiator is cured by photoirradiation under an atmosphere equal to or lower than predetermined oxygen concentration for not causing oxygen inhibition to polymerization of photocurable resin or electron beam-curable resin, an ultraviolet ray in wavelength region corresponding to a light absorption characteristic of the photocurable resin or the electron beam-curable resin is irradiated on the photocurable resin or the electron beam-curable resin to polymerize the photocurable resin or the electron beam-curable resin. After an ultraviolet ray is irradiated on the photocurable resin or the electron beam-curable resin to polymerize at least a surface layer, an electron beam is irradiated on the photocurable resin or the electron beam-curable resin to polymerize a deep part, and
(Continued)

the entire photocurable resin or the entire electron beam-curable resin is cured.

8 Claims, 21 Drawing Sheets

(51) Int. Cl.
| | |
|---|---|
| C09D 11/101 | (2014.01) |
| C09D 11/322 | (2014.01) |
| C08F 2/54 | (2006.01) |
| B01J 19/08 | (2006.01) |
| B01J 19/12 | (2006.01) |

(52) U.S. Cl.
CPC .............. *C08F 2/54* (2013.01); *C09D 11/101* (2013.01); *C09D 11/322* (2013.01); *B41J 2002/012* (2013.01)

(56) References Cited

U.S. PATENT DOCUMENTS

| | | | |
|---|---|---|---|
| 4,906,550 A | 3/1990 | Shimanoe et al. | |
| 5,059,664 A | 10/1991 | Yada et al. | |
| 6,550,905 B1 | 4/2003 | Deckers | |
| 6,727,508 B1 | 4/2004 | Tominaga et al. | |
| 2008/0199631 A1* | 8/2008 | Makuta | C09D 11/101 427/511 |
| 2009/0286098 A1* | 11/2009 | Yajima | B29C 39/148 428/507 |
| 2009/0318591 A1 | 12/2009 | Ageishi et al. | |
| 2010/0080913 A1 | 4/2010 | Irita | |
| 2015/0124032 A1 | 5/2015 | De Mondt et al. | |
| 2015/0343795 A1* | 12/2015 | Uchida | F21V 29/51 347/102 |

FOREIGN PATENT DOCUMENTS

| | | |
|---|---|---|
| JP | 50-116579 A | 9/1975 |
| JP | 01-236207 A | 9/1989 |
| JP | 02-64106 A | 3/1990 |
| JP | 02-97501 A | 4/1990 |
| JP | 2001-215300 A | 8/2001 |
| JP | 4452504 B | 4/2010 |
| WO | WO-2013/182517 A2 | 12/2013 |
| WO | WO-2015/016131 A1 | 2/2015 |
| WO | WO-2016/158209 A | 10/2016 |

OTHER PUBLICATIONS

International Search Report dated Apr. 11, 2017 for the corresponding PCT Patent Application No. PCT/JP2017/001584.
Written Opinion dated Apr. 11, 2017 for the corresponding PCT Patent Application No. PCT/JP2017/001584.
Kato, "Ultraviolet Curing System", Feb. 28, 1989, pp. 29-31, Kabushikigaisha, Sohgoh Gijutsu Sentah (United Engineering Center, Co., Ltd.).
International Preliminary Report on Patentability dated Aug. 9, 2018 for the corresponding International Application No. PCT/JP2017/001584.
Extended European Search Report dated Jul. 2, 2019 for the corresponding European Patent Application No. 17744049.2.

* cited by examiner

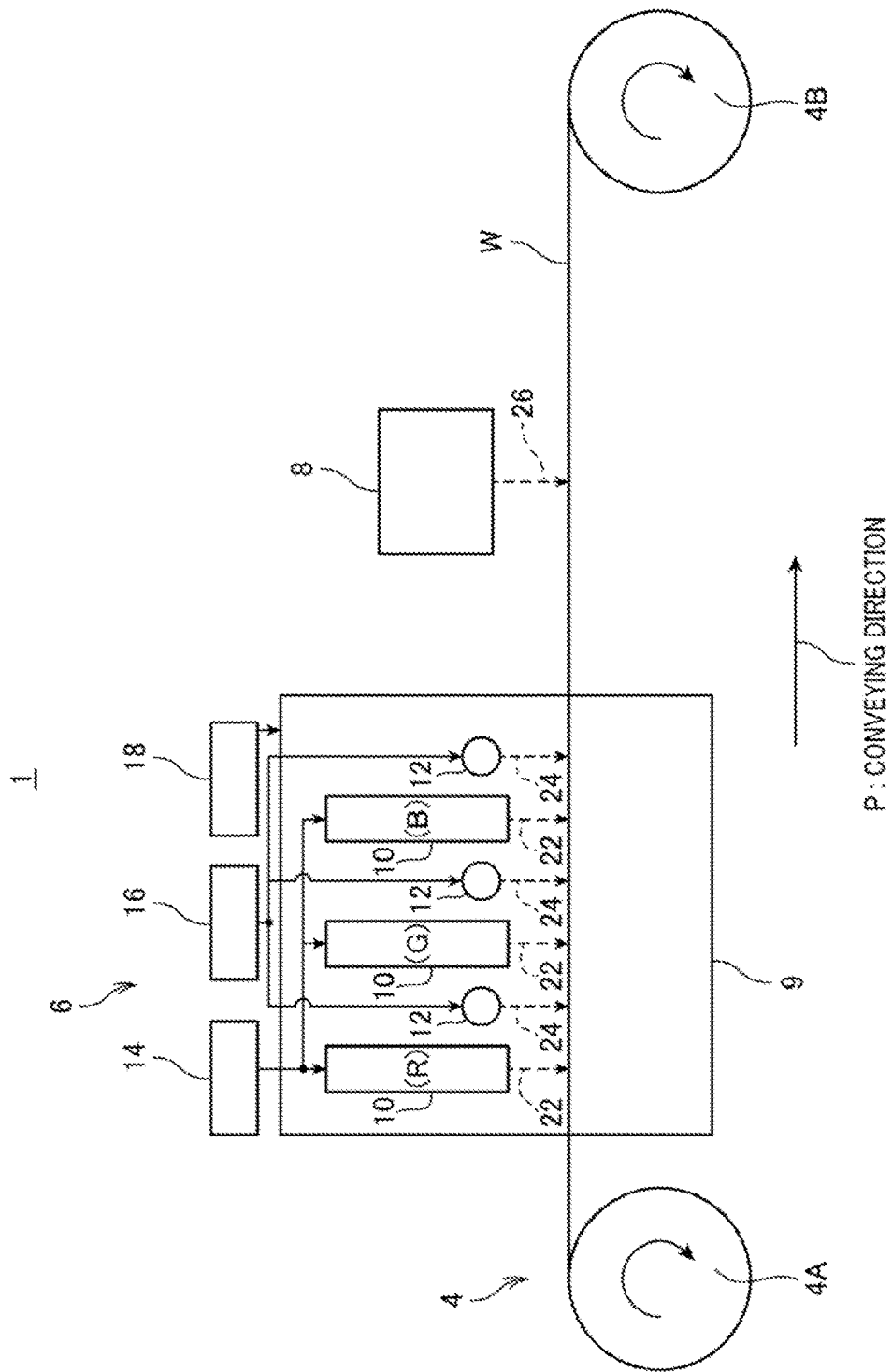

FIG.2A
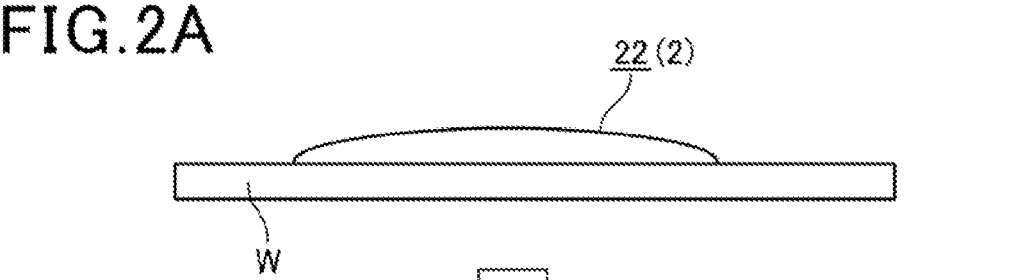
FIG.2B
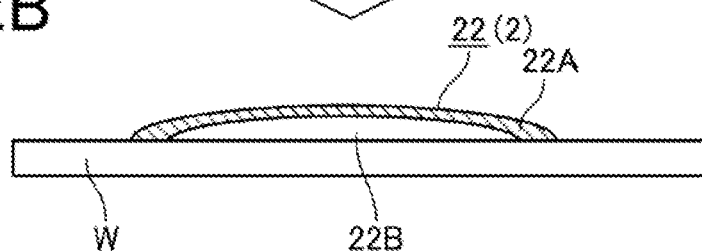
FIG.2C

FIG.3

| TYPE | MERIT | DEMERIT | STRUCTURE |
|---|---|---|---|
| EPOXY ACRYLATE | CURABILITY CHEMICAL RESISTANCE ADHESION | WEATHER RESISTANCE HIGH VISCOSITY | A—[EPOXY]—A<br>  OH    OH |
| URETHANE ACRYLATE | FLEXIBILITY WEATHER RESISTANCE ABRASION RESISTANCE BALANCE OF PHYSICAL PROPERTIES | PRICE HIGH VISCOSITY | A—U—([ISOCYANATE]—U—[ALCOHOL]—U—[ISOCYANATE])ₙ—U—A |
| POLYESTER ACRYLATE | INEXPENSIVE LOW VISCOSITY BALANCE OF PHYSICAL PROPERTIES | CHEMICAL RESISTANCE | A—[POLYESTER]—A |

FIG.4

(RESULT OF EXPERIMENT 1)

ATMOSPHERE: OXYGEN CONCENTRATION 300 ppm OR LESS
ILLUMINANCE: WAVELENGTH 254nm  10mW/cm$^2$
　　　　　　　WAVELENGTH 185nm  1mW/cm$^2$

| IRRADIATION TIME | 5 SECONDS | 10 SECONDS | 30 SECONDS | 1 MINUTE | 3 MINUTES |
|---|---|---|---|---|---|
| CURING STATE | △ | ○ | ○ | ○ | ○ |

×: NOT CURED
△: INSIDE IS NOT CURED
○: CURED

FIG.5

(RESULT OF EXPERIMENT 2)

ATMOSPHERE: IN AIR
ILLUMINANCE: WAVELENGTH 254nm  10mW/cm²
WAVELENGTH 185nm  1mW/cm²

| IRRADIATION TIME | 5 SECONDS | 10 SECONDS | 30 SECONDS | 1 MINUTE | 3 MINUTES |
|---|---|---|---|---|---|
| CURING STATE | × | × | × | × | × |

× : NOT CURED
△ : INSIDE IS NOT CURED
○ : CURED

FIG.6

(RESULT OF EXPERIMENT 3)

ATMOSPHERE: IN AIR
ILLUMINANCE: WAVELENGTH 254nm  30mW/cm$^2$
　　　　　　　WAVELENGTH 185nm  NO IRRADIATION

| IRRADIATION TIME | 5 SECONDS | 10 SECONDS | 30 SECONDS | 1 MINUTE | 3 MINUTES |
|---|---|---|---|---|---|
| CURING STATE | × | × | × | × | × |

× : NOT CURED
△ : INSIDE IS NOT CURED
○ : CURED

FIG.7

(RESULT OF EXPERIMENT 4)

ATMOSPHERE: OXYGEN CONCENTRATION 300 ppm OR LESS
ILLUMINANCE: WAVELENGTH 254nm  30mW/cm$^2$
　　　　　　WAVELENGTH 185nm  NO IRRADIATION

| IRRADIATION TIME | 5 SECONDS | 10 SECONDS | 30 SECONDS | 1 MINUTE | 3 MINUTES |
|---|---|---|---|---|---|
| CURING STATE | × | △ | ○ | ○ | ○ |

× : NOT CURED
△ : INSIDE IS NOT CURED
○ : CURED

FIG.8

(RESULT OF EXPERIMENT 5)

ATMOSPHERE: OXYGEN CONCENTRATION 300 ppm OR LESS
ILLUMINANCE: WAVELENGTH 172nm  13mW/cm$^2$

| IRRADIATION TIME | 5 SECONDS | 10 SECONDS | 30 SECONDS | 1 MINUTE | 3 MINUTES |
|---|---|---|---|---|---|
| CURING STATE | ○ | ○ | ○ | ○ | ○ |

× : NOT CURED
△ : INSIDE IS NOT CURED
○ : CURED

FIG.9

(RESULT OF EXPERIMENT 6)

ATMOSPHERE: IN AIR
ILLUMINANCE: WAVELENGTH 172nm  13mW/cm$^2$

| IRRADIATION TIME | 5 SECONDS | 10 SECONDS | 30 SECONDS | 1 MINUTE | 3 MINUTES |
|---|---|---|---|---|---|
| CURING STATE | × | × | × | × | × |

× : NOT CURED
△ : INSIDE IS NOT CURED
○ : CURED

FIG.10

(RESULT OF EXPERIMENT 7)

ATMOSPHERE: OXYGEN CONCENTRATION 300 ppm OR LESS
ILLUMINANCE: WAVELENGTH 365nm 15mW/cm²

| IRRADIATION TIME | 5 SECONDS | 10 SECONDS | 30 SECONDS | 1 MINUTE | 3 MINUTES |
|---|---|---|---|---|---|
| CURING STATE | × | × | × | × | × |

× : NOT CURED
△ : INSIDE IS NOT CURED
○ : CURED

FIG.11

(RESULT OF EXPERIMENT 8)

| IRRADIATION TIME | | 5 SECONDS | 10 SECONDS | 30 SECONDS | 1 MINUTE | 3 MINUTES |
|---|---|---|---|---|---|---|
| CORRESPONDING TO EXPERIMENT 1 | CURING STATE | △ | ○ | ○ | ○ | ○ |
| CORRESPONDING TO EXPERIMENT 2 | CURING STATE | × | × | × | × | × |
| CORRESPONDING TO EXPERIMENT 3 | CURING STATE | × | × | × | × | × |
| CORRESPONDING TO EXPERIMENT 4 | CURING STATE | × | ○ | ○ | ○ | ○ |
| CORRESPONDING TO EXPERIMENT 5 | CURING STATE | ○ | × | ○ | ○ | ○ |
| CORRESPONDING TO EXPERIMENT 6 | CURING STATE | × | × | × | × | × |
| CORRESPONDING TO EXPERIMENT 7 | CURING STATE | × | × | × | × | × |

×: NOT CURED
△: INSIDE IS NOT CURED
○: CURED

CURING METHOD AND CURING SYSTEM

CROSS-REFERENCE TO RELATED PATENT APPLICATIONS

This application is a U.S. National Phase Application under 35 U.S.C. § 371 of International Patent Application No. PCT/JP2017/001584, filed Jan. 18, 2017 and claims the benefit of Japanese Patent Application No. 2016-013598, filed Jan. 27, 2016, all of which are incorporated by reference in their entirety herein. The International Application was published in Japanese on Aug. 3, 2017 as International Publication No. WO/2017/130819 under PCT Article 21(2).

FIELD OF THE INVENTION

The present invention relates to a curing technique for photocurable resin and electron beam-curable resin.

BACKGROUND OF THE INVENTION

There is widely known a photocuring technique for irradiating an ultraviolet ray (UV light) on photocurable resin and curing the photocurable resin.

In general, the photocurable resin is a liquefied resin composition containing photopolymerizable oligomer, photopolymerizable monomer, a photopolymerization initiator, and various additives. The additives are, for example, a stabilizer, a filler, and a coloring agent (a pigment).

The photopolymerizable monomer is an organic material that causes polymerization reaction according to ultraviolet ray irradiation and forms a polymer, which is a larger molecule.

The photopolymerizable oligomer is an organic material obtained by causing the photopolymerizable monomer to react in advance to form a so-called prepolymer. Like the photopolymerizable monomer, the photopolymerizable oligomer causes the polymerization reaction according to ultraviolet ray irradiation and forms a polymer.

Because the photopolymerizable oligomer has relatively high viscosity, in the photocurable resin, in general, the photopolymerizable oligomer is diluted by the photopolymerizable monomer having low viscosity.

The photopolymerization initiator is a material (called photoinitiator as well) added to start the polymerization reaction. It is known that the photopolymerizable oligomer and the photopolymerizable monomer do not cause the polymerization reaction according to irradiation of an ultraviolet ray. Therefore, the photopolymerization initiator is contained in the photocurable resin.

The photopolymerization initiator is excited according to reception of irradiation of an ultraviolet ray, cleaves, and generates a radical. By the radical, the photopolymerizable oligomer and the photopolymerizable monomer polymerize to be converted into a polymer (see, for example, Kiyoshi Kato, "Ultraviolet Curing System", Kabushikigaisha, Sohgoh Gijutsu Sentah (United Engineering Center, Co., Ltd.), issued on Feb. 28, 1989, p. 29 to 31).

Note that, in addition to the photopolymerization initiator, an amine-based or quinone-based photopolymerization auxiliary initiator is sometimes added to the photocurable resin according to necessity.

In general, as the photopolymerization initiator, a superoxide such as a benzoin-based, acetoacetic phonon-based, or peroxide-based superoxide is used. Therefore, it is undesirable that the photopolymerization initiator, which is the superoxide, remains in resin after curing.

In particular, in recent years, an ultraviolet LED having low illuminance compared with an electric discharge lamp has been used as a light source. To supplement illuminance insufficiency, content concentration of the photopolymerization initiator tends to be higher. Therefore, the photopolymerization initiator more easily remains.

Therefore, there is known a technique for, to enable curing of photocurable resin not including or relatively not including a photopolymerization initiator, reducing oxygen in a region close to the surface of a base material, on which the photocurable resin is deposited, and increasing an amount of UV light reaching the photocurable resin (see, for example, Japanese Patent No. 4452504).

Technical Problem

Incidentally, there is known a technique for irradiating an electron beam (EB) instead of an ultraviolet ray light source to cure curable resin (so-called electron beam-curable resin) not containing a photopolymerization initiator. However, in general, there is a problem in that the photopolymerizable monomer volatilizes and smoke easily occurs during the resin curing by the irradiation of the electron beam.

Therefore, an object of the present invention is to provide a curing method and a curing system that can cure, with light irradiation, photocurable resin or electron beam-curable resin not containing a photopolymerization initiator.

SUMMARY OF THE INVENTION

Solution to Problem

To achieve the object, the present invention provides a curing method for photocurable resin or electron beam-curable resin including: irradiating, on the photocurable resin or the electron beam-curable resin not containing a photopolymerization initiator, under an atmosphere in which oxygen concentration is equal to or lower than predetermined oxygen concentration, an ultraviolet ray in wavelength region corresponding to a light absorption characteristic of the photocurable resin or the electron beam-curable resin, and thereby polymerizing the photocurable resin or the electron beam-curable resin, the predetermined oxygen concentration being oxygen concentration for not causing oxygen inhibition to the polymerization of the photocurable resin or the electron beam-curable resin; and irradiating the ultraviolet ray on the photocurable resin or the electron beam-curable resin to polymerize at least a surface layer and thereafter irradiating an electron beam to polymerize a deep part and curing the entire photocurable resin or the electron beam-curable resin.

To achieve the object, the present invention provides a curing system that cures photocurable resin or electron beam-curable resin not containing a photopolymerization initiator, the curing system including: a light source that irradiates an ultraviolet ray on the photocurable resin or the electron beam-curable resin; oxygen-concentration reducing means for reducing oxygen concentration of an atmosphere in which the ultraviolet ray is irradiated on the photocurable resin or the electron beam-curable resin to predetermined concentration or less; and an electron-beam irradiating apparatus that irradiates an electron beam on the photocurable resin or the electron beam-curable resin in a state in which at least a surface layer is polymerized by the irradiation of the ultraviolet ray.

In the present invention, the curing system includes discharging means for discharging ink including the photocurable resin or the electron beam-curable resin added with a pigment. The light source irradiates the ultraviolet ray on the ink discharged by the discharging means and cures the ink.

To achieve the object, the present invention provides a curing system that cures photocurable resin or electron beam-curable resin not containing a photopolymerization initiator, the curing system including: a light source that irradiates an ultraviolet ray on the photocurable resin or the electron beam-curable resin; oxygen-concentration reducing means for reducing oxygen concentration of an atmosphere in which the ultraviolet ray is irradiated on the photocurable resin or the electron beam-curable resin to predetermined concentration or less; and a negative plate to which ink containing the photocurable resin or the electron beam-curable resin is applied. The light source irradiates the ultraviolet ray on the ink applied to the negative plate and transferred to work and cures the ink.

In the present invention, the curing system includes an electron-beam irradiating apparatus that irradiates an electron beam on the photocurable resin or the electron beam-curable resin in a state in which at least a surface layer is polymerized by the irradiation of the ultraviolet ray.

In the present invention, in the curing system, the negative plate is a planographic plate.

In the present invention, in the curing system, the negative plate is a relief printing plate.

In the present invention, in the curing system, the negative plate is an intaglio printing plate.

Advantageous Effects of Invention

According to the present invention, the electron beam is irradiated on the photocurable resin or the electron beam-curable resin in the state in which at least the surface layer is polymerized by the irradiation of the ultraviolet ray. Therefore, oxygen inhibition is prevented by a cured film formed on the surface layer. The polymerization by the electron beam can be efficiently performed. Occurrence of smoke by the electron beam irradiation is reduced by this cured film. Therefore, the photocurable resin and the electron beam-curable resin can be cured without the polymerization initiator contained in the photocurable resin and the electron beam-curable resin.

BRIEF DESCRIPTION OF THE DRAWINGS

FIG. 1 is a diagram schematically showing the configuration of a curing system according to a first embodiment of the present invention.

FIG. 2A is a diagram showing ink containing photocurable resin applied to work.

FIG. 2B is a diagram showing a state in which an ultraviolet ray is irradiated on the ink under a low-oxygen concentration atmosphere to form a cured film on a surface layer of the ink.

FIG. 2C is a diagram showing a state in which an electron beam is irradiated on the ink to cure the entire ink from the surface layer to a deep part.

FIG. 3 is a diagram showing, for each type of a photopolymerizable oligomer, a merit and a demerit of using the photopolymerizable oligomer in photocurable resin and showing the structure of the photopolymerizable oligomer.

FIG. 4 is a diagram showing a result of an experiment 1.

FIG. 5 is a diagram showing a result of an experiment 2.

FIG. 6 is a diagram showing a result of an experiment 3.

FIG. 7 is a diagram showing a result of an experiment 4.

FIG. 8 is a diagram showing a result of an experiment 5.

FIG. 9 is a diagram showing a result of an experiment 6.

FIG. 10 is a diagram showing a result of an experiment 7.

FIG. 11 is a diagram showing a result of an experiment 8.

DETAILED DESCRIPTION OF THE INVENTION

First Embodiment

<Curing System>

Figure 12:
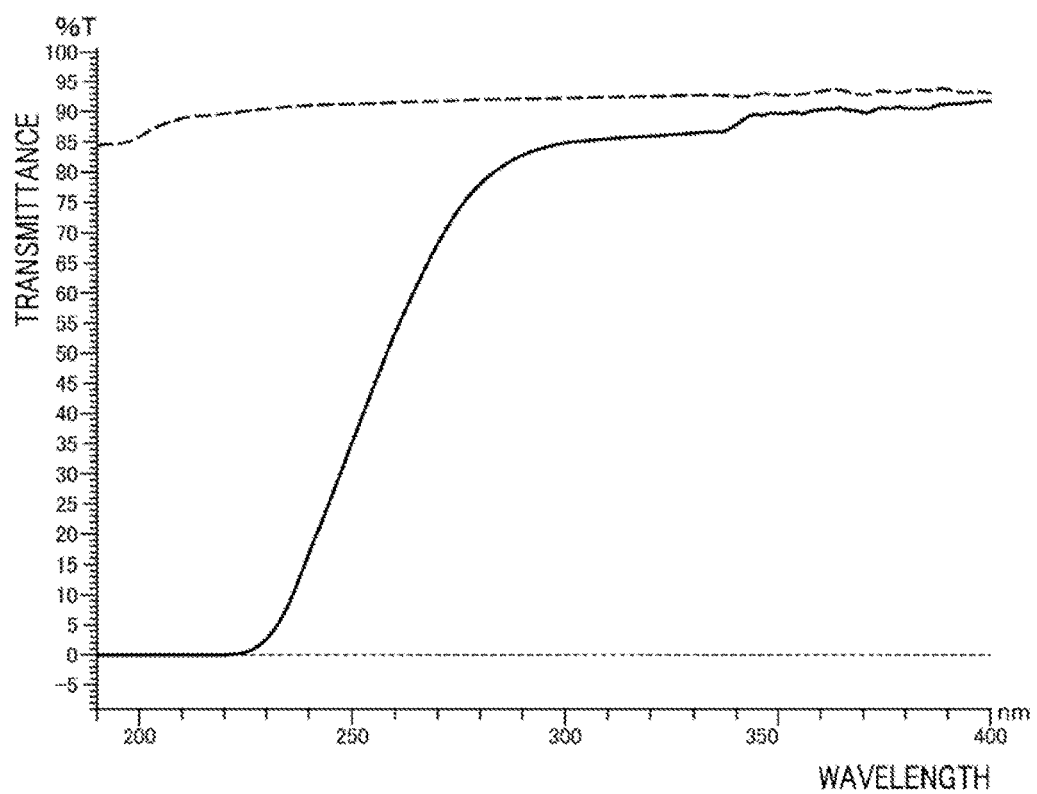
FIG. 12 is a diagram showing transmittance of light of 190 nm to 400 nm.

First, a curing system 1 according to a first embodiment in which a curing method of the present invention is used is explained.

In the first embodiment, as an example of the curing system 1, a system that performs inkjet printing an image on a soft packaging material is illustrated. Note that the curing method of the present invention can be used in so-called offset printing for transferring ink using a negative plate, flexographic printing, and gravure printing besides the system that performs the inkjet printing. A curing system that transfers ink using a negative plate according to the curing method of the present invention is explained below as second, third, and fourth embodiments.

FIG. 1 is a diagram schematically showing the configuration of the curing system 1 according to this embodiment.

This curing system 1 is a system that uses a soft packaging material formed in a long belt shape as work W, applies ink including photocurable resin 2 to the surface of the work W with inkjet printing, and cures the ink to form an image. This curing system 1 includes, as shown in FIG. 1, a conveying apparatus 4, an inkjet printing apparatus 6, and an electron-beam irradiating apparatus 8.

The conveying apparatus 4 is an apparatus that conveys the work W. The conveying apparatus 4 includes a pair of rollers 4A and 4B on which the work W is wound. The work W is conveyed in one direction according to rotation of the rollers 4A and 4B.

The inkjet printing apparatus 6 is an apparatus that, under an atmosphere in which oxygen concentration is reduced to predetermined concentration, applies ink 22 formed by the photocurable resin 2 and polymerizes the ink 22 with irradiation of an ultraviolet ray in a predetermined wavelength band to cure the ink 22. The ultraviolet ray used in this embodiment is a vacuum ultraviolet ray having a wavelength region near 10 nm to 200 nm, UV-C having a wavelength region near 100 nm to 280 nm, and UV-B having a wavelength region near 280 nm to 315 nm. The ink 22 is ink with viscosity reduced to enable the ink to be ejected as droplets by mixing pigments corresponding to colors in the photocurable resin 2 not including a photopolymerization initiator and diluting the photocurable resin 2 such that a photopolymerizable monomer occupies approximately 80% or more.

This inkjet printing apparatus 6 includes, as shown in FIG. 1, a nitrogen purge box 9, three ink heads 10 (discharging means), three light source devices 12, a printing control unit 14, a light-source control unit 16, and an atmosphere control unit 18.

In the field of a photocuring technique, it has been a technical common sense that photocurable resin contains a photopolymerization initiator and, instead of an ultraviolet ray, an electron beam is irradiated for curing of curable resin not containing the photopolymerization initiator.

On the other hand, there is a method of curing photocurable resin not containing a photopolymerization initiator by irradiating an ultraviolet ray on the photocurable resin under an atmosphere in which oxygen concentration is equal to or lower than predetermined oxygen concentration.

In detail, the photocurable resin used in this curing method is a resin material having absorption at least in a wavelength region of the ultraviolet ray in a light absorption characteristic. The photocurable resin is a resin composition containing a photopolymerizable oligomer or a photopolymerizable monomer and not containing a photopolymerization initiator and is a liquid body having viscosity corresponding to a use.

Various additives such as a stabilizer, a filler, and a coloring agent (a pigment) may be added to the photocurable resin according to a use.

As the photopolymerizable oligomer, acrylate such as epoxy acrylate, urethane acrylate, or polyester acrylate or methacrylate such as isobornyl methacrylate (IBXMA), tetrahydrofurfuryl methacrylate (THFMA), 2-hydroxy ethyl methacrylate (HEMA), cyclohexyl methacrylate (CHMA), or lauryl methacrylate (LMA) can be used.

In general, a photopolymerizable oligomer dominates a curing physical property of photocurable resin. A photopolymerizable oligomer of an appropriate type is used according to a use. In FIG. 3, for each of several acrylate oligomers, a merit and a demerit at the time when the acrylate oligomer is used as the photopolymerizable oligomer and the structure of the acrylate oligomer are illustrated.

In this curing method, any photopolymerizable oligomer shown in FIG. 3 can be cured without the photocurable resin containing the photopolymerization initiator.

As explained above, the photopolymerizable monomer is used as a dilution agent for the photopolymerizable oligomer. 1-functional acrylate, 2-functional acrylate, or multi-functional acrylate can be used.

The ultraviolet ray is light having a light emission spectrum having a peak in at least a wavelength region in which the photocurable resin absorbs light. Note that the peak of the light emission spectrum does not always need to be a maximum peak in a full wavelength region. The peak of the light emission spectrum only has to be located in the wavelength region in which the photocurable resin absorbs light or only has to include the entire or a part of wavelength region in the width of the peak.

The nitrogen purge box 9 is a box body, through the inside of which the work W is conveyed. A nitrogen gas, which is an example of an inert gas, is sent into the inside of the nitrogen purge box 9, whereby an atmosphere on the inside is maintained in the atmosphere equal to or lower than the predetermined oxygen concentration. Note that it goes without saying that another inert gas may be used instead of the nitrogen gas. A configuration may be adopted in which, instead of the nitrogen purge box 9, a vacuum chamber, the inside of which is evacuated by a vacuum pump (maintained in the atmosphere equal to or lower than the predetermined oxygen concentration), is used to convey the work W through the inside of the vacuum chamber.

The atmosphere control unit 18 controls an introduction amount of the nitrogen gas into the nitrogen purge box 9 and controls oxygen concentration on the inside.

Oxygen-concentration reducing means for reducing oxygen concentration of an atmosphere to predetermined concentration or less is configured by the nitrogen purge box 9 and the atmosphere control unit 18. The oxygen concentration of the atmosphere only has to be concentration smaller than concentration at which oxygen in the atmosphere and radical generated in the photocurable resin by the irradiation of the ultraviolet ray react and photopolymerization reaction is inhibited (oxygen inhibition).

Note that, if the oxygen concentration of the atmosphere can be reduced to the predetermined oxygen-concentration, any means can be used as the oxygen concentration reducing means.

The ink heads 10 are provided for each of red (R) ink 22, green (G) ink 22, and blue (B) ink 22. The ink heads 10 discharge droplets of the inks 22 and apply the inks 22 to the work W. These three ink heads 10 are disposed at predetermined intervals along a conveying direction P in the nitrogen purge box 9. According to the conveyance of the work W, the red (R), green (G), and blue (B) inks 22 are applied to the work W in order.

The printing control unit 14 controls the discharge of the inks 22 of the ink heads 10 on the basis of an image formed on the surface of the work W by the inks 22.

Note that, in the inkjet printing apparatus 6, an ink head that discharges droplets of black ink and applies the black ink to the work W can be further provided.

The order for applying the inks 22 of the colors can be changed as appropriate.

The light source devices 12 are disposed for each of the ink heads 10 to be adjacent to a downstream side of the ink heads 10 on the inside of the nitrogen purge box 9. The light source devices 12 irradiate ultraviolet rays 24 having a predetermined wavelength on the work W. As light sources of this light source devices 12, lamp light sources that radiate light in a wavelength region in which the photocurable resin 2 absorbs light in the ultraviolet region explained above are used. As the lamp light sources, for example, a discharge lamp such as an ultra-high-pressure mercury lamp, a low-pressure mercury lamp, an excimer lamp, or a Xenon lamp, an LED light source, and a laser beam can be used.

The light-source control unit 16 controls flashing of each of the light source devices 12.

In this inkjet printing apparatus 6, as explained in detail below, surface layers 22A of the inks 22 applied by the respective ink heads 10 on an upstream side are quickly polymerized, cured, and fixed by the irradiation of the ultraviolet ray 24 of the respective light source devices 12. Therefore, the inks 22 applied by the respective ink heads 10 are not mixed. A high-quality image can be formed on the surface of the work W. Note that, in this embodiment, a configuration is adopted in which the plurality of ink heads 10 and the light source devices 12 disposed for each of the ink heads 10 to be adjacent to the downstream side of the ink heads 10 are disposed on the inside of the nitrogen purge box 9. However, the nitrogen purge box 9 is not limited to this. For example, the nitrogen purge box 9 may have a configuration in which the nitrogen purge box 9 is provided for each of pairs of the ink heads 10 and the light source devices 12. A configuration may be adopted in which a plurality of the nitrogen purge boxes 9, on the inside of which several pairs of the ink heads 10 and the light source devices 12 are included, are provided.

The electron-beam irradiating apparatus 8 is disposed on the downstream side of the inkjet printing apparatus 6. The electron-beam irradiating apparatus 8 irradiates an electron beam 26 on the work W. As this electron-beam irradiating apparatus 8, a general apparatus used for curing of electron beam-curable resin can be used.

The inks 22 on the surface of the work W is polymerized and cured to the inside by the electron beam 26 of this electron-beam irradiating apparatus 8. The image is fixed on the work W.

More in detail, as shown in FIG. 2A, in the inkjet printing apparatus 6, the ultraviolet ray 24 is irradiated on the ink 22 applied to the work W under a low-oxygen concentration atmosphere, whereby the ink 22 containing the photocurable resin 2 is polymerized.

At this time, the ultraviolet ray 24 has a relatively short wavelength and is strongly absorbed by the photocurable resin 2 of the ink 22. The photocurable resin 2 of the ink 22 undergoes radical polymerization reaction. However, most of the ultraviolet ray 24 is absorbed in a surface layer 22A without reaching a deep part 22B of the ink 22. The surface layer 22A is polymerized by the radical polymerization reaction by the irradiation of the ultraviolet ray 24. Consequently, a cured film having thickness corresponding to the thickness of the ink 22 and a content of the photocurable resin 2 is formed on the surface layer 22A.

Therefore, as shown in FIG. 2B, mainly the surface layer 22A of the ink 22 is polymerized and cured by the irradiation of the ultraviolet ray 24. The deep part 22B is generally uncured while keeping a low-molecular state.

The electron beam 26 of the electron-beam irradiating apparatus 8 is irradiated on the ink 22 in such a state, whereby the photopolymerizable monomer remaining in the deep part 22B of the ink 22 is polymerized and cured. As shown in FIG. 2C, the entire ink 22 is cured from the surface layer 22A to the deep part 22B.

In a state during the irradiation of this electron beam 26, because the surface layer 22A of the ink 22 is polymerized, the cured film is formed on the surface layer 22A. Consequently, intrusion of the oxygen remaining in the atmosphere into the ink 22 is inhibited by the cured film of the surface layer 22A. Consequently, the oxygen inhibition explained above is prevented. The polymerization by the electron beam 26 can be efficiently performed.

In general, in the inkjet printing apparatus, to discharge the droplets of the ink 22 and apply the ink 22 to the work W, a low-molecular ink is used as the ink 22. When the electron beam 26 is irradiated on the low-molecular ink 22 to cure resin, the photopolymerizable monomer volatilizes and smoke easily occurs. On the other hand, in this curing system 1, as explained above, in the state during the electron beam irradiation, the cured film by the ultraviolet ray irradiation is formed on the surface layer 22A of the ink 22. Therefore, the occurrence of the smoke is reduced by this cured film.

Note that, when the thickness of the ink 22 applied to the surface of the work W is small and the ultraviolet ray 24 irradiated by the light source device 12 reaches the deep part 22B of the ink 22, it is unnecessary to irradiate the electron beam 26.

In other words, by concurrently using the irradiation of the electron beam 26, the ink 22 can be sufficiently cured to the deep part 22B even if the ink 22 (the photocurable resin 2) is thick.

In this way, with this curing system 1, the photocurable resin 2 of the ink 22 can be polymerized and cured by the irradiation of the ultraviolet ray 24 without the polymerization initiator contained in the photocurable resin 2 of the ink 22. Therefore, a cured object not containing the photopolymerization initiator can be obtained.

In addition, because the ink 22 can be surely cured to the deep part 22B of the ink 22 by the electron beam irradiation, remaining of the photopolymerizable monomer can also be prevented.

In particular, by using the curing system 1 for image formation on a surface of a soft packaging material used for packaging of foods and the like, an image after formation does not contain the photopolymerization initiator and remaining of the photopolymerizable monomer is prevented. Therefore, compared with the conventional image forming method, a soft packaging material having higher quality in terms of safety and the like can be obtained.

Note that this curing system 1 can also be used for, for example, hard coat treatment on the surfaces of various kinds of work besides the image formation on the soft packaging material.

In this curing system 1, electron beam-curable resin can also be used instead of the photocurable resin 2 not containing the photopolymerization initiator.

<Curing Experiments>

Curing experiments of photocurable resin performed by the inventors are explained below.

In these curing experiments, as the photocurable resin, a liquid resin composition containing a multi-function acrylate-based photopolymerizable monomer and not containing a photopolymerizable oligomer and a photopolymerization initiator was used.

This photocurable resin was applied to a PET (polyethylene terephthalate) film at thickness of approximately 20 μm by a bar coater (an application test machine) to manufacture a sample.

A nitrogen purge was used for adjustment of oxygen concentration of an atmosphere.

Experiment 1

In this experiment 1, a UV cleaning and modifying device (model number OC2506) manufactured by Iwasaki Electric Co., Ltd. was used as a light source.

This UV cleaning and modifying device includes six low-pressure mercury lamps of 25 W (watt) and irradiates an ultraviolet ray of 185 nm and an ultraviolet ray of 254 nm. A light amount ratio of the ultraviolet ray of 185 nm and the ultraviolet ray of 254 nm is approximately 1:10.

Illuminance of the ultraviolet ray of 185 nm on a sample surface was set to 1 mW/cm$^2$ and illuminance of the ultraviolet ray of 254 nm on the sample surface was set to 10 mW/cm$^2$.

Under an atmosphere in which oxygen concentration was reduced to low-oxygen concentration of 300 ppm or less by a nitrogen purge, light of the light source, that is, light including the ultraviolet ray of 185 nm and the ultraviolet ray of 254 nm was irradiated on the sample. A curing state of the photocurable resin applied to the sample was observed by changing an irradiation time.

FIG. 4 is a diagram showing a result of the experiment 1.

As shown in FIG. 4, in this experiment 1, it was observed that the photocurable resin was cured in any irradiation time. It was observed that, as the curing state, a surface became sticky when the irradiation time was reduced to a certain degree and a deep part (an inside) changed to an uncured state.

Therefore, according to the result of this experiment 1, it was clarified that, even if the photocurable resin of the sample did not contain the photopolymerization initiator, the photocurable resin was polymerized and cured by the irradiation of the light including the ultraviolet ray of 185 nm and the ultraviolet ray of 254 nm under the low-oxygen concentration atmosphere.

Experiment 2

This experiment 2 was performed by, in the experiment 1, changing the atmosphere from the low-oxygen concentration state to the air. An experiment result of this experiment 2 is shown in FIG. 5.

As shown in FIG. 5, in this experiment 2, irrespective of the irradiation time, curing of the photocurable resin of the sample was not observed.

Therefore, according to the result of this experiment 2, it was clarified that, even when the light of the same light source as the light source in the experiment 1 was irradiated, the photocurable resin of the sample was not cured unless the atmosphere was in the low-oxygen concentration state.

Experiment 3

This experiment 3 was performed by, in the experiment 2, cutting the ultraviolet ray of 185 nm and irradiating light of only the ultraviolet ray of 254 nm.

However, unlike the experiment 1 and the experiment 2, a device used as a light source in this experiment 3 was a device including three low-pressure mercury lamps of 100 W and a filter for cutting the ultraviolet ray of 185 nm from radiated light of the low-pressure mercury lamps.

The ultraviolet ray of 254 nm of the light source was irradiated on the sample surface at illuminance of 30 mW/cm$^2$. The illuminance of this ultraviolet ray of 254 nm is equivalent to illuminance three times as high as the illuminance in the experiment 2.

An experiment result of the experiment 3 is shown in FIG. 6.

As shown in FIG. 6, in this experiment 3, irrespective of the irradiation time, curing of the photocurable resin of the sample was not observed.

According to the result of this experiment 3, it was clarified that, under the same atmosphere in the air as the atmosphere in the experiment 2, when only the ultraviolet ray of 254 nm was irradiated, the photocurable resin of the sample was not cured, for example, even if the illuminance of the ultraviolet ray of 254 nm was increased to three times.

Experiment 4

This experiment 4 was performed by, in the experiment 3, setting the atmosphere to the same low-oxygen concentration state as the low-oxygen concentration state in the experiment 1.

An experiment result of this experiment 4 is shown in FIG. 7.

As shown in FIG. 7, in this experiment 4, it was observed that, when the irradiation time was reduced to a certain degree, although the photocurable resin was uncured, the curing was promoted more as the irradiation time was longer. It was clarified that, when the irradiation time was increased to a certain degree, the curing state was a state of the same degree as in the case of the experiment 1 in which the irradiation of the ultraviolet ray of 185 nm was polymerized.

Experiment 5

In this experiment 5, an ultraviolet ray of 172 nm was radiated (radiated from a Xenon excimer lamp) instead of the ultraviolet ray of 185 nm and the ultraviolet ray of 254 nm. Illuminance of the ultraviolet ray of 172 nm on the sample surface was set to 13 mW/cm$^2$. This experiment 5 was performed by setting the atmosphere to the same low-oxygen concentration state as the low-oxygen concentration state in the experiment 1.

An experiment result of this experiment 5 is shown in FIG. 8.

As shown in FIG. 8, in this experiment 5, it was observed that the photocurable resin was cured in any irradiation time. It was clarified that the photocurable resin was cured even by the irradiation in a short time.

Experiment 6

This experiment 6 was performed by, in the experiment 5, changing the atmosphere from the low-oxygen concentration state to the air. An experiment result of this experiment 6 is shown in FIG. 9.

As shown in FIG. 9, in this experiment 6, curing of the photocurable resin of the sample was not observed irrespective of the irradiation time.

Therefore, according to the result of this experiment 6, it was clarified that, even when the light of the same light source as the light source in the experiment 5 was irradiated, the photocurable resin of the sample was not cured unless the atmosphere was in the low-oxygen concentration state.

Experiment 7

In this experiment 7, an ultraviolet ray of 365 nm was radiated (radiated from an ultraviolet LED) instead of the ultraviolet ray of 172 nm in the experiment 5. Illuminance of the ultraviolet ray of 365 nm on the sample surface was set to 15 mW/cm$^2$. This experiment 7 was performed by setting the atmosphere to the same low-oxygen concentration state as the low-oxygen concentration state in the experiment 5.

An experiment result of this experiment 5 is shown in FIG. 10.

As shown in FIG. 10, in this experiment 7, curing of the photocurable resin of the sample was not observed irrespective of the irradiation time.

Experiment 8

This experiment was performed by, in the experiment 1 to the experiment 7, mixing a photopolymerizable oligomer and an additive in a photocurable resin and manufacturing a sample from this photocurable resin. An acrylate-based oligomer was used as the photopolymerizable oligomer. A black pigment was used as the additive.

As the sample, a sample obtained by dissolving this photocurable resin in a solvent to generate black ink, applying this ink to a PET film by a bar coater at thickness of 20 µm, and drying the ink with a drier was used.

An experiment result of this experiment 7 is shown in FIG. 11.

As shown in FIG. 11, even when the photocurable resin contains the photopolymerizable oligomer and the additive, the same result as the results of the experiment 1 to the experiment 7 was obtained as a curing state of the photocurable resin of the sample.

According to a result of this experiment 8, it was clarified that, irrespective of whether the photocurable resin contained the photopolymerizable oligomer and the additive, by irradiating at least the ultraviolet ray of 185 nm on the photocurable resin not containing the photopolymerization initiator under the low-concentration oxygen atmosphere, the photocurable resin caused polymerization reaction and was cured.

The inventors consider that these experiment results are due to a light absorption characteristic of the photopolymerizable monomer.

FIG. 12 is a diagram showing a result obtained by using, as a sample, resin dripped on a quartz plate and uniformly spread and confirming transmittance (a light absorption spectrum) of light of 190 nm to 400 nm with a spectrophotometer. Note that, in FIG. 12, a broken line indicates the transmittance of only the quartz plate of a substrate and a solid line indicates the transmittance of the sample obtained by dripping the resin on the quartz plate and uniformly spreading the resin.

As indicated by light absorption spectrum data of FIG. 12, in the multi-function acrylate used as the photopolymerizable monomer, an acryloyl group has absorption at 300 nm, which is a vacuum ultraviolet wavelength region, in a light absorption characteristic. Therefore, it is considered that a photon of an ultraviolet ray having large photon energy (the ultraviolet ray of 254 nm or the ultraviolet ray of 185 nm) is efficiently absorbed by the acryloyl group of the photopolymerizable monomer, the acryloyl group cleaves, and a radical is generated, whereby the photopolymerizable monomer is polymerized.

Note that, when the photopolymerizable oligomer has absorption in the vacuum ultraviolet wavelength region in the light absorption characteristic, it is considered that the photopolymerizable oligomer is polymerized in the same manner as the photopolymerizable monomer.

Naturally, the oxygen concentration in the atmosphere affects the oxygen inhibition. However, the oxygen absorbs ultraviolet rays of 200 nm or less and generates ozone. The ozone absorbs the ultraviolet rays in width centering on the ultraviolet ray near 260 nm. Therefore, efficiency is deteriorated because a light amount decreases in the irradiation on the photocurable resin. Therefore, by reducing the oxygen concentration in the atmosphere, the absorption in the atmosphere of the ultraviolet rays of 300 nm or less from the light source is reduced. The ultraviolet rays are efficiently irradiated on the photocurable resin. According to this as well, it is considered that the polymerization reaction was efficiently performed.

According to this consideration, by irradiating, under the atmosphere of the low-oxygen concentration, on a photocurable resin having a light absorption characteristic in a predetermined wavelength region, an ultraviolet ray having a wavelength corresponding to the light absorption characteristic, the polymerization reaction can be caused and the photocurable resin can be cured even if the photocurable resin does not contain the photopolymerization initiator.

Concerning the electron beam-curable resin, it is derived that, if the electron beam-curable resin has a light absorption characteristic in a predetermined wavelength region, the polymerization reaction can be caused and the electron beam-curable resin can be cured by irradiating, under the atmosphere of the low oxygen concentration, an ultraviolet ray having a wavelength corresponding to the light absorption characteristic.

As explained above, according to this embodiment, effects explained below are achieved.

That is, with the curing method according to this embodiment, after the ultraviolet ray is irradiated on the photocurable resin or the electron beam-curable resin to polymerize at least the surface layer 22A, the electron beam 26 is irradiated to polymerize the deep part 22B, and the entire ink 22 is cured. Therefore, the ink 22 can be surely cured to the deep part 22B.

In a pre-stage of the electron beam irradiation, the surface layer 22A is polymerized and cured by the irradiation of the ultraviolet ray. Therefore, the oxygen inhibition during the electron beam irradiation can be surely prevented. Occurrence of smoke due to volatilization of the photopolymerizable monomer or the like can be prevented.

The curing method in which the photocurable resin 2 or the electron beam-curable resin explained above not containing the photopolymerization initiator is used can be suitably used for a curing system in which a negative plate of offset printing, flexographic printing, gravure printing or the like besides the inkjet printing is used. Various embodiments of the curing system in which the negative plate is used are explained below.

Second Embodiment

In the first embodiment, the curing system 1 that applies the ink 22 including the photocurable resin 2 with the inkjet printing and curing the ink 22 to form an image is described. In this second embodiment, a curing system in which the curing method of the present invention is used for offset printing (planographic plate printing) for transferring ink 122 including the photocurable resin 2 to the work W using a negative plate 113 is explained. As explained above, in the inkjet printing explained in the first embodiment, the ink 22 is diluted by the photopolymerizable monomer to be ejected as liquid droplets. Therefore, during the resin curing by the irradiation of the electron beam 26, there is a problem in that the photopolymerizable monomer volatilizes and smoke easily occurs. Therefore, after the ultraviolet ray is irradiated to polymerize and cure the surface layer 22A, the electron beam 26 is irradiated to polymerize the deep part, and the entire ink 22 is cured to prevent occurrence of smoke due to the volatilization of the photopolymerizable monomer or the like.

On the other hand, in the offset printing in the second embodiment for transferring the ink 122 to the work W using the negative plate 113, because the ink 122 having high viscosity is used, a ratio of the photopolymerizable monomer in the ink 122 is low and concern about smoke caused by the volatilization of the ink 122 is small. However, in the offset printing, pressure in transferring the ink 122 to the work W is high. Therefore, to superimpose the inks 122 of a plurality of colors, the inks 122 need to be cured every time one color is transferred. There is a problem in that an apparatus is expensive.

Note that, in the second embodiment, the same components as the components in the first embodiment explained above are denoted by the same reference numerals and signs in the figure and explanation of the components is omitted.

Figure 13:
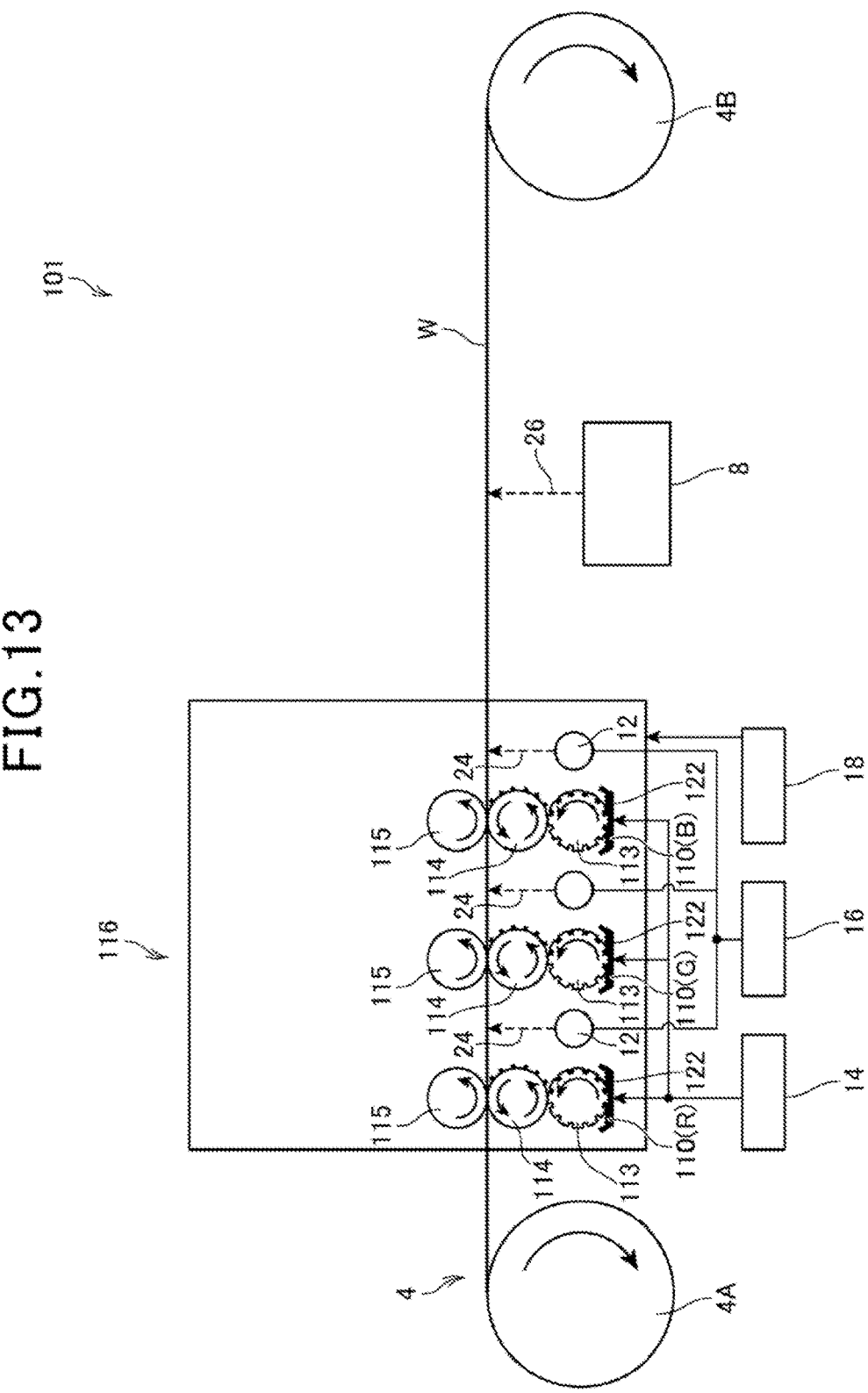
FIG. 13 is a diagram schematically showing the configuration of a curing system according to a second embodiment of the present invention.

FIG. 13 is a diagram schematically showing the configuration of a curing system 101 according to this embodiment.

This curing system 101 is a system that applies, to the surface of the work W formed in a long belt shape, the ink 122 formed by the photocurable resin 2 not including the photopolymerization initiator using the negative plate 113 of a so-called planographic plate and cures the ink 122 with ultraviolet ray/electron beam irradiation to form an image.

The curing system 101 includes an offset printing apparatus 116. The offset printing apparatus 116 is an apparatus that, under an atmosphere in which oxygen concentration is reduced to predetermined concentration, applies the ink 122 formed by the photocurable resin 2 to the surface of the work W and cures the ink 122 with irradiation of an ultraviolet ray in a predetermined wavelength band. The ink 122 is ink obtained by mixing pigments corresponding to colors in the photocurable resin 2 not including the photopolymerization initiator.

Liquid tanks 110 in which the inks 122 are stored are provided on the inside of the nitrogen purge box 9. The liquid tanks 110 are provided for each of the red (R) ink 122, the green (G) ink 122, and the blue (B) ink 122. Roll-like negative plates 113 corresponding to the liquid tanks 110 are provided. The negative plates 113 are so-called planographic plates. Fine unevenness is added to the surfaces of the negative plates 113. The negative plates 113 are disposed such that parts of the surfaces of the negative plates 113 are immersed in the inks 122 in the liquid tanks 110. The negative plates 113 are configured such that the inks 122 are applied to recessed sections when the negative plates 113 are immersed in the inks 122. Note that, although not shown in the figure, a configuration may be adopted in which doctor blades for removing, from the surfaces of the negative plates 113, excess inks 122 in the inks 122 applied to the surfaces of the negative plates 113 are provided.

Figure 14:
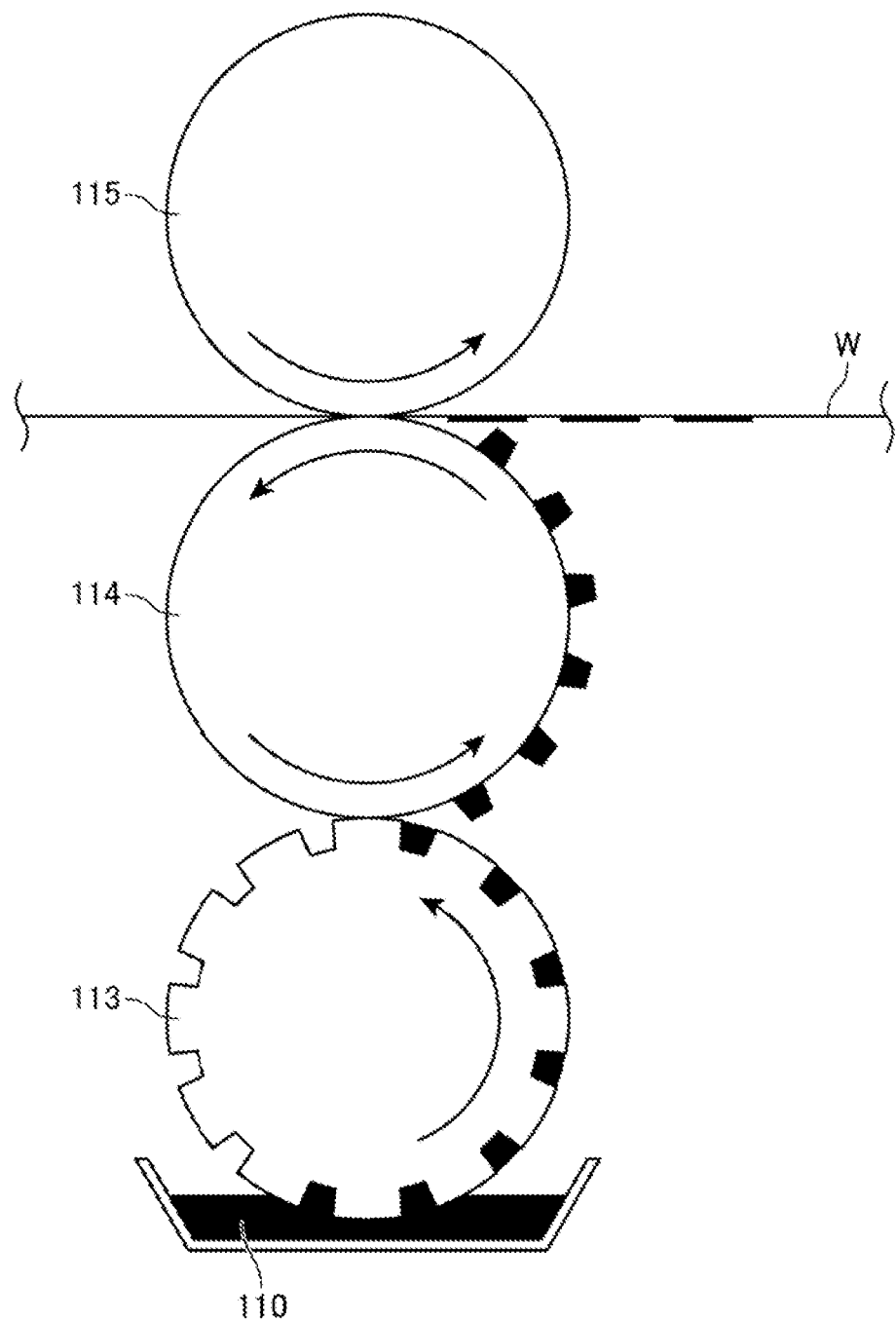
FIG. 14 is a partially enlarged view of an offset printing apparatus.

Transfer rolls 114 to which the inks 122 applied to the recessed sections of the negative plates 113 are transferred are provided for each of the negative plates 113. Further, pressurizing rolls 115 for transferring the inks 122 convexly transferred to the transfer rolls 114 to the surface of the work W are provided for each of the transfer rolls 114. As shown in FIG. 14, the ink 122 convexly transferred to the transfer roll 114 is transferred to be squashed on the surface of the work W conveyed in a state in which the work W is held between the transfer roll 114 and the pressurizing roll 115.

The light source devices 12 are disposed, for each of the liquid tanks 110, to be adjacent to the downstream side of the liquid tank 110 on the inside of the nitrogen purge box 9. The light source devices 12 irradiate ultraviolet rays 24 having a predetermined wavelength on the work W. In this offset printing apparatus 116, surface layers of the inks 122 applied to the surface of the work W from the respective liquid tanks 110 on the upstream side are quickly polymerized by the irradiation of the respective ultraviolet rays 24 of the light source devices 12. Consequently, cured films are formed on the surface layers 22A of the inks 122. Therefore, the inks 122 applied from the respective liquid tanks 110 are not mixed. Printing pressure in superimposing and applying the inks 122 can be increased by the cured films formed by polymerizing the surface layers 22A of the inks 122. A high-quality image can be formed on the surface of the work W.

The electron-beam irradiating apparatus 8 is disposed on the downstream side of the offset printing apparatus 116. The electron beam 26 is irradiated on the work W. The inks 122 superimposed and applied to the surface of the work W are cured to the insides by the electron beam 26 of the electron-beam irradiating apparatus 8. The image is fixed on the work W.

With these configurations, it is possible to form a high-quality image using the offset printing by the irradiation of the ultraviolet ray/the electron beam by efficiently performing the curing of the inks 122 of the colors not containing the photopolymerization initiator.

Note that, in this curing system 101, the electron beam-curable resin can also be used instead of the photocurable resin 2 not containing the photopolymerization initiator.

Third Embodiment

In the second embodiment, the offset printing for transferring the ink 122 to the work W using the negative plate 113 of the so-called planographic plate is explained. In this third embodiment, a curing system 102 in which the curing method of the present invention is used for flexographic printing in which a negative plate of a so-called relief printing plate is used is explained. In the flexographic printing in this third embodiment, as in the offset printing in the second embodiment, because the ink 122 having high viscosity is used, a concern about smoke caused by volatilization of the ink 122 is small. In the flexographic printing, to superimpose the inks 122 of a plurality of colors, the inks 122 need to be cured every time one color is transferred. There is a problem in that an apparatus is expensive.

Note that, in the third embodiment, the same components as the components in the first embodiment or the second embodiment explained above are denoted by the same reference numerals and signs in the figure and explanation of the components is omitted.

Figure 15:
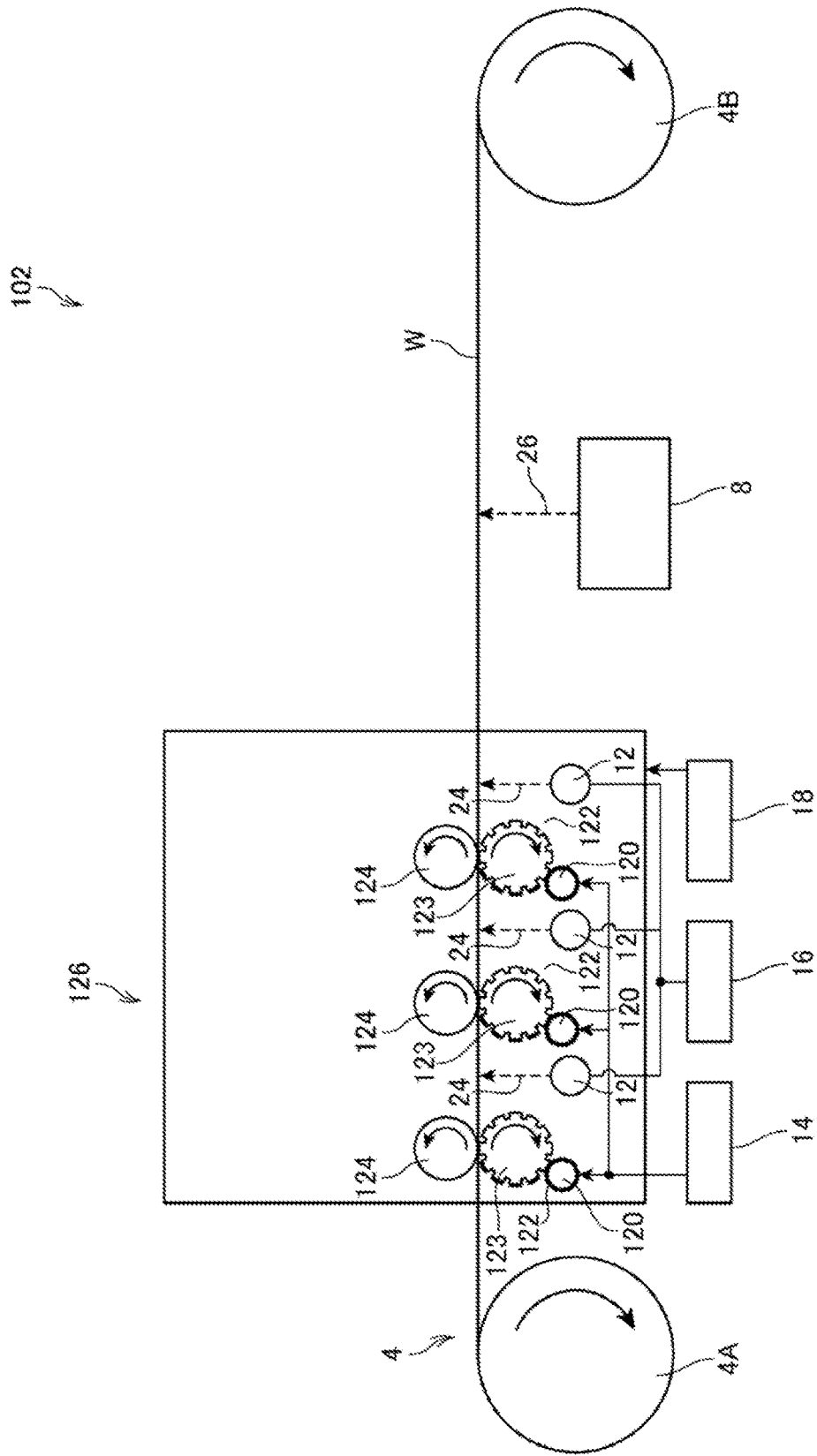
FIG. 15 is a diagram schematically showing the configuration of a curing system according to a third embodiment of the present invention.

FIG. 15 is a diagram schematically showing the configuration of the curing system 102 according to this embodiment.

This curing system 102 is a system that applies, to the surface of the work W formed in a long belt shape, the ink 122 formed by the photocurable resin 2 not including the photopolymerization initiator using a negative plate 123 of a so-called relief printing plate and cures the ink 122 to form an image. Note that, in the curing system 102, a soft packaging material can be used as the work W.

The curing system 102 includes a flexographic printing apparatus 126. The flexographic printing apparatus 126 is an apparatus that, under an atmosphere in which oxygen concentration is reduced to predetermined concentration, applies the ink 122 formed by the photocurable resin 2 not including the photopolymerization initiator to the surface of the work W and cures the ink 122 with irradiation of an ultraviolet ray in a predetermined wavelength band. The ink 122 is ink obtained by mixing pigments corresponding to colors in the photocurable resin 2 not including the photopolymerization initiator.

Ink rollers 120 impregnated with the inks 122 are provided on the inside of the nitrogen purge box 9. The ink rollers 120 are provided for each of the red (R) ink 122, the green (G) ink 122, and the blue (B) ink 122. Although not shown in the figure, the ink rollers 120 may be configured to supply the inks 122 with a nozzle or may be configured to supply the inks 122 by being immersed in liquid tanks in which the inks 122 are stored.

Figure 16:
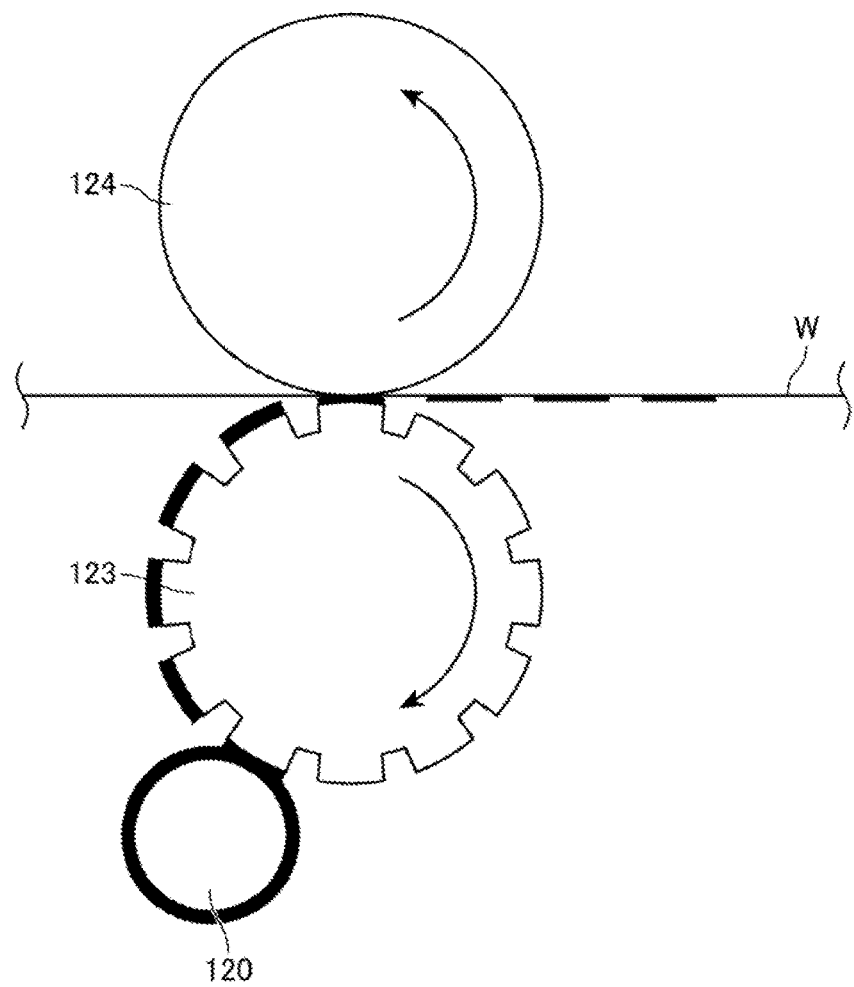
FIG. 16 is a partially enlarged view of a flexographic printing apparatus.

Roll-like negative plates 123 corresponding to the ink rollers 120 are provided. The negative plates 123 are so-called relief printing plates. Unevenness is added to the surfaces of the negative plates 123. The negative plates 123 are configured such that the inks 122 are applied to projecting sections of the surface from the ink rollers 120. As shown in FIG. 16, the inks 122 applied to the projecting sections of the negative plates 123 are transferred to be squashed on the surface of the work W conveyed in a state in which the work W is held between the negative plates 123 and the pressurizing rolls 124.

The light source devices 12 are disposed for each of the ink rollers 120 to be adjacent to the downstream side of the ink rollers 120 on the inside of the nitrogen purge box 9. The light source devices 12 irradiate ultraviolet rays 24 having a predetermined wavelength on the work W. In this flexographic printing apparatus 126, the surface layers 22A of the inks 122 applied to the surface of the work W from the respective ink rollers 120 on the upstream side are quickly polymerized by the irradiation of the respective ultraviolet rays 24 of the light source devices 12 and cured films are formed on the surface layers 22A. Consequently, the inks 122 applied from the respective ink rollers 120 are not mixed. Printing pressure in superimposing and applying the inks 122 can be increased by the cured films formed by polymerizing the surface layers 22A of the inks 122. A high-quality image can be formed on the surface of the work W.

The electron-beam irradiating apparatus 8 is disposed on the downstream side of the flexographic printing apparatus 126. The electron beam 26 is irradiated on the work W. The inks 122 superimposed and applied to the surface of the work W are polymerized to the insides by the electron beam 26 of the electron-beam irradiating apparatus 8. The entire inks 122 are cured. The image is fixed on the work W.

With these configurations, it is possible to form a high-quality image using the flexographic printing by the irradiation of the ultraviolet ray/the electron beam by efficiently performing the curing of the inks 122 of the colors not containing the photopolymerization initiator.

Note that, in this curing system 102, the electron beam-curable resin can also be used instead of the photocurable resin 2 not containing the photopolymerization initiator.

Fourth Embodiment

In the second embodiment, the curing system 101 in which the curing method of the present invention is used for the offset printing is explained. In the third embodiment, the curing system 102 in which the curing method of the present invention is used for the flexographic printing is explained. In this fourth embodiment, a curing system 103 in which the curing method of the present invention is used for gravure printing in which a negative plate of a so-called intaglio printing plate is used is explained. In the gravure printing in the fourth embodiment, as in the second and third embodiments, because the ink 122 having high viscosity is used, a concern about smoke caused by volatilization of the ink 122 is small. On the other hand, in the gravure printing, because the ink 122 is applied thick to the surface of the work W, when the photocurable resin or the electron beam-curable resin is used, there is a problem in the light transmittance is low and it takes time to cure the ink 122 to the inside. To superimpose the inks 122 of a plurality of colors, the inks 122 need to be cured every time one color is applied. There is a problem in that a printing time increases and an apparatus is expensive.

Note that, in the fourth embodiment, the same components as the components in the first, second, and third embodiments explained above are denoted by the same reference numerals and signs in the figure and explanation of the components are omitted.

Figure 17:
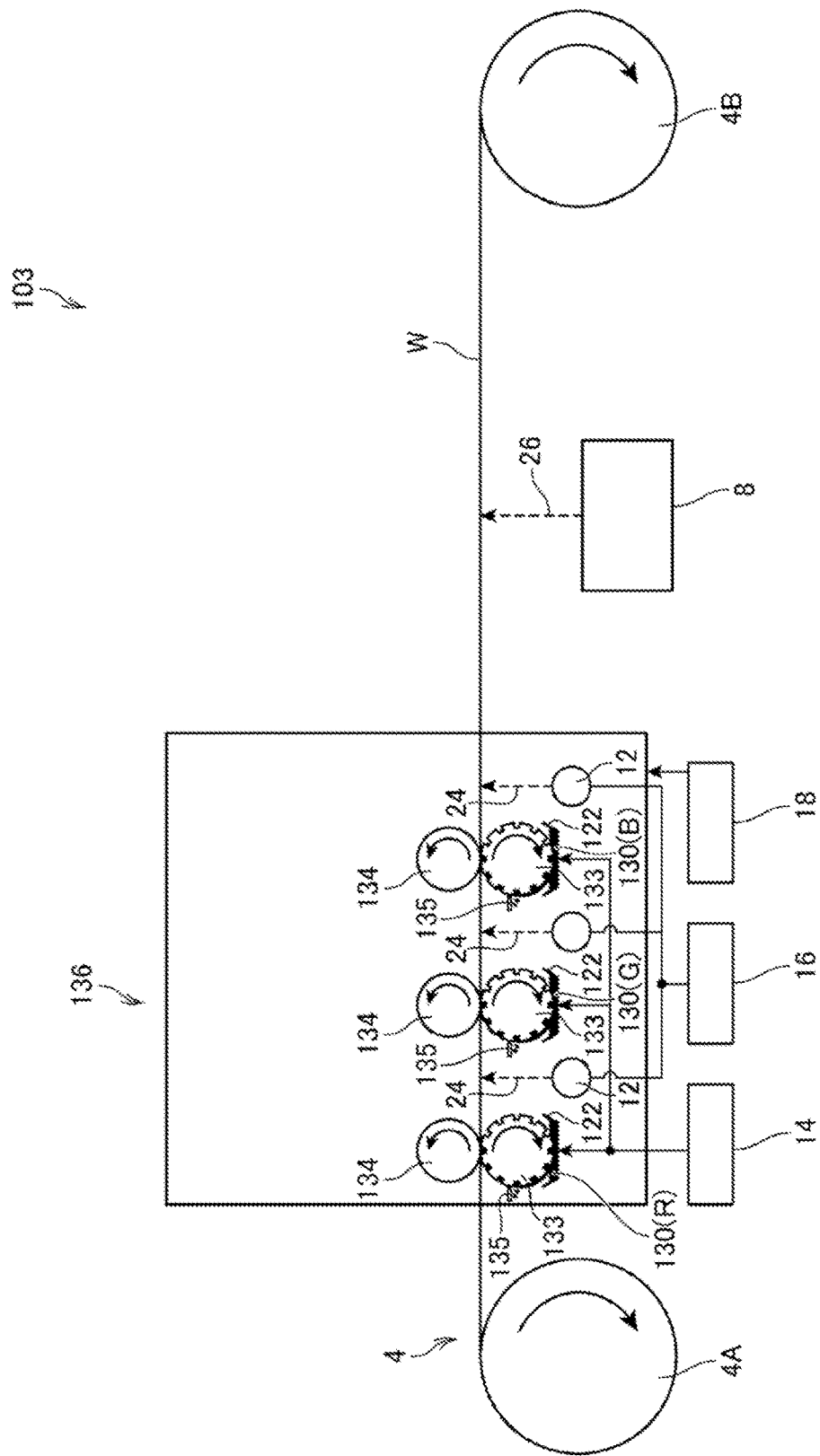
FIG. 17 is a diagram schematically showing the configuration of a curing system according to a fourth embodiment of the present invention.

FIG. 17 is a diagram schematically showing the configuration of a curing system 103 according to this embodiment.

This curing system 103 is a system that applies, to the surface of the work W formed in a long belt shape, the ink 122 formed by the photocurable resin 2 not including the photopolymerization initiator using a negative plate 133 of a so-called intaglio printing plate and cures the ink 122 to form an image.

The curing system 103 includes a gravure printing apparatus 136. The gravure printing apparatus 136 is an apparatus that, under an atmosphere in which oxygen concentration is reduced to predetermined concentration, applies the ink 122 formed by the photocurable resin 2 to the surface of the work W and cures the ink 122 with irradiation of an ultraviolet ray in a predetermined wavelength band. The ink 122 is ink obtained by mixing pigments corresponding to colors in the photocurable resin 2 not including the photopolymerization initiator.

Liquid tanks 130 in which the inks 122 are stored are provided on the inside of the nitrogen purge box 9. The liquid tanks 130 are provided for each of the red (R) ink 122, the green (G) ink 122, and the blue (B) ink 122. Roll-like negative plates 133 are provided for each of the liquid tanks 130. The negative plates 133 are so-called intaglio printing plates. Unevenness is added to the surfaces of the negative plates 133. The negative plates 133 are disposed such that parts of the surfaces of the negative plates 133 are immersed in the inks 122 in the liquid tanks 130. The negative plates 133 are configured such that the inks 122 are applied to recessed sections when the negative plates 133 are immersed in the inks 122.

Figure 18:
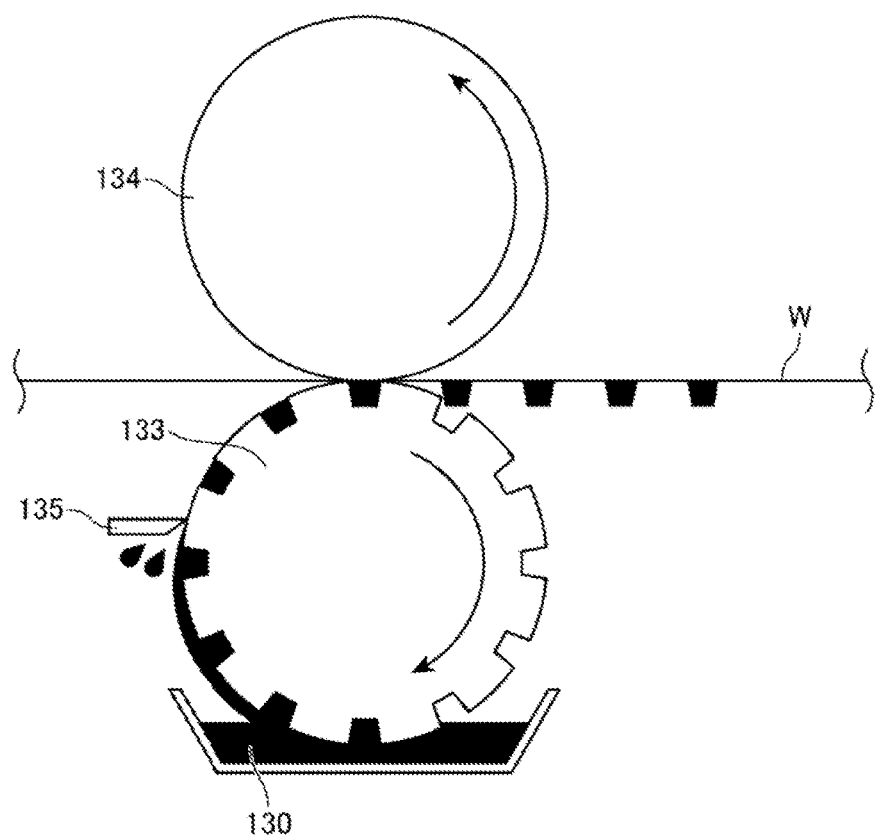
FIG. 18 is a partially enlarged view of a gravure printing apparatus.

Doctor blades 135 for removing, from the surfaces of the negative plates 133, excess inks 122 in the inks 122 applied to the surfaces of the negative plates 133 are provided. Further, pressurizing rolls 134 for transferring the inks 122 applied to recessed sections of the negative plates 133 to the surface of the work W are provided for each of the negative plates 133. As shown in FIG. 18, the ink 122 applied to the recessed sections of the negative plate 133 is transferred to the surface of the work W conveyed in a state in which the work W is held between the negative plate 133 and the pressurizing roll 134. Consequently, the ink 122 applied to the recessed sections of the negative plate 133 is convexly applied thick to the surface of the work W.

The light source devices 12 are disposed, for each of the liquid tanks 130, to be adjacent to the downstream side of the liquid tanks 130 on the inside of the nitrogen purge box 9. The light source devices 12 irradiate the ultraviolet rays 24 having a predetermined wavelength on the work W. In this gravure printing apparatus 136, surface layers 22A of the inks 122 applied to the surface of the work W from the respective liquid tanks 130 on the upstream side are quickly polymerized by the irradiation of the respective ultraviolet rays 24 of the light source devices 12, and cured films are formed. Consequently, the inks 122 applied from the respective liquid tanks 130 are not mixed and are superimposed and applied. A high-quality image can be formed on the surface of the work W.

The electron-beam irradiating apparatus 8 is disposed on the downstream side of the gravure printing apparatus 136. The electron beam 26 is irradiated on the work W. The inks 122 superimposed and applied to the surface of the work W are polymerized to the insides by the electron beam 26 of the electron-beam irradiating apparatus 8. The entire inks 122 are cured. The image is fixed on the work W.

With these configurations, it is possible to form a high-quality image using the gravure printing by the irradiation of the ultraviolet ray/the electron beam by efficiently performing the curing of the inks 122 of the colors not containing the photopolymerization initiator.

Note that, in this curing system 103, the electron beam-curable resin can also be used instead of the photocurable resin 2 not containing the photopolymerization initiator.

Incidentally, in the curing system in which the offset printing explained in the second embodiment is used, the curing system in which the flexographic printing explained in the third embodiment is used, and the curing system in which the gravure printing explained in the fourth embodiment is used, as in the curing system in which the inkjet printing of the first embodiment is used, a configuration is adopted in which, after the ultraviolet ray is irradiated on the ink including the photocurable resin or the electron beam-curable resin not containing the photopolymerization initiator to polymerize the surface layer, the electron beam is irradiated to polymerize the ink to the inside and cure the ink.

However, in the printing in which the negative plate is used such as the offset printing, the flexographic printing, and the gravure printing, it is unnecessary to discharge ink. Therefore, a content of a monomer of the ink is approximately ⅓ to ¼ compared with the inkjet printing. As the monomer contained in the ink used for the printing in which the negative plate is used, a monomer that is not low-molecular and has a large molecular weight can be used. In the printing in which the negative plate is used, the pressurizing roll is brought into contact with the work W to transfer the ink to the work W. Therefore, the printing pressure is high. Because of such factors, the inventors found that, in the printing in which the negative plate is used such as the offset printing, the flexographic printing, or the gravure printing, the ink can be sufficiently cured by, in the atmosphere in which the oxygen concentration is reduced to the predetermined concentration or less, irradiating the ultraviolet ray on the ink including the photocurable resin or the electron beam-curable resin not containing the photopolymerization initiator transferred from the negative plate to the work.

Figure 19:
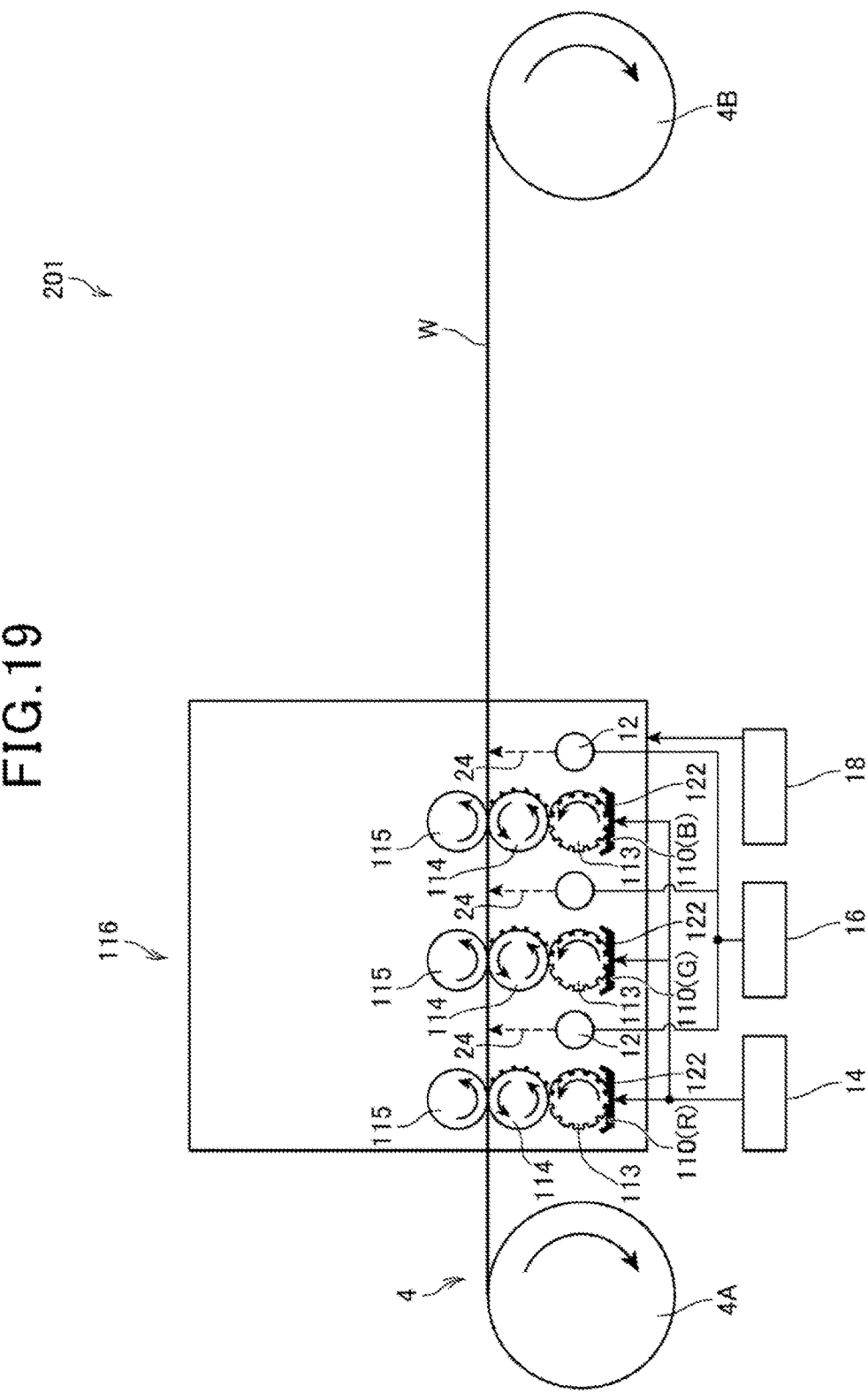
FIG. 19 is a diagram showing a modification of a curing system in which offset printing is used.
Figure 20:
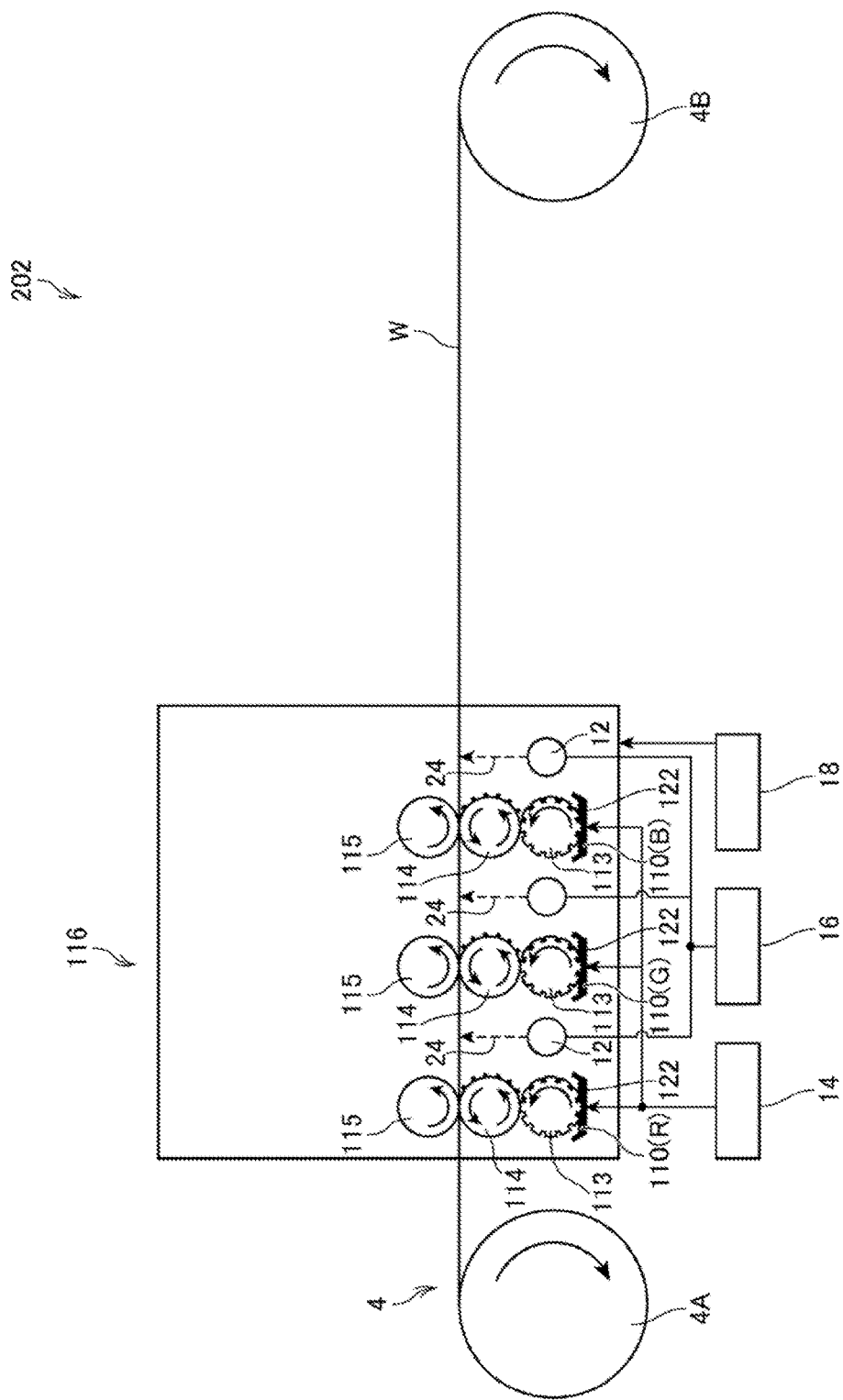
FIG. 20 is a diagram showing a modification of a curing system in which flexographic printing is used.
Figure 21:
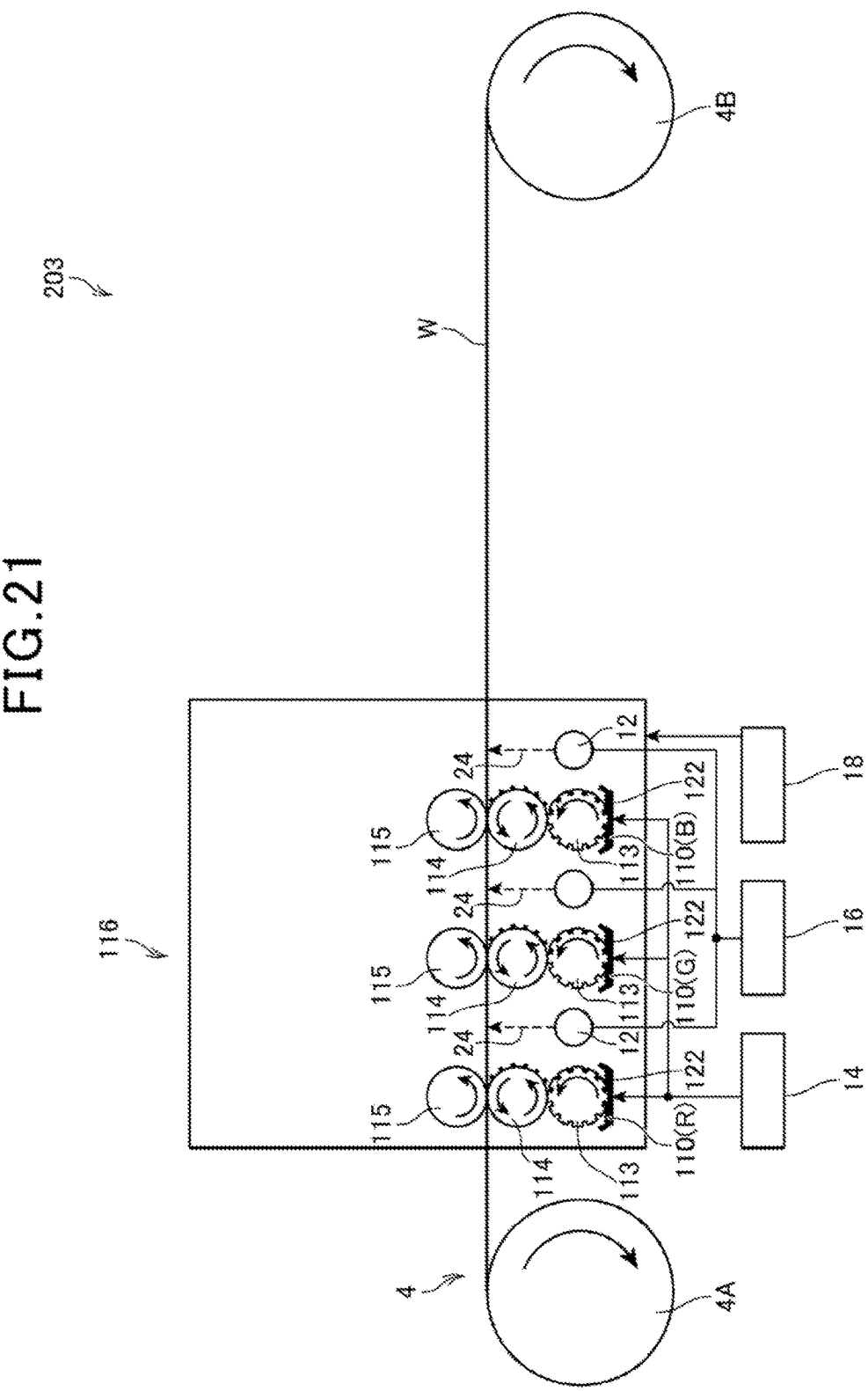
FIG. 21 is a diagram showing a modification of a curing system in which gravure printing is used.

Therefore, as shown in FIG. 19, as a modification of the curing system in which the offset printing is used, a configuration of a curing system 201 in which an electron-beam irradiating apparatus is omitted can be adopted. As shown in FIG. 20, as a modification of a curing system in which the flexographic printing is used, a configuration of a curing system 202 in which an electron-beam irradiating apparatus is omitted can be adopted. Further, as a modification of the curing system in which the gravure printing is used, a configuration of a curing system 203 in which an electron-beam irradiating apparatus is omitted can be adopted.

Note that the embodiments explained above are only illustrations of an aspect of the present invention. It goes without saying that any modifications and applications are possible in the scope of the gist of the present invention.

REFERENCE SIGNS LIST 1, 101, 102, 103 curing system
2 photocurable resin
6 inkjet printing apparatus
8 electron-beam irradiating apparatus
9 nitrogen purge box
10 ink head (discharging means)
12 light source device
22, 122 ink
22A surface layer
22B deep part
24 ultraviolet ray
26 electron beam
116 offset printing apparatus
126 flexographic printing apparatus
136 gravure printing apparatus
W work

The invention claimed is:

1. A curing method for photocurable resin or electron beam-curable resin comprising the steps of:
   irradiating, on the photocurable resin or the electron beam-curable resin not containing a photopolymerization initiator, under an atmosphere in which oxygen concentration is equal to or lower than predetermined oxygen concentration, an ultraviolet ray in wavelength region corresponding to a light absorption characteristic of the photocurable resin or the electron beam-curable resin, and thereby polymerizing the photocurable resin or the electron beam-curable resin, the predetermined oxygen concentration being oxygen concentration for not causing oxygen inhibition to the polymerization of the photocurable resin or the electron beam-curable resin; and
   irradiating the ultraviolet ray on the photocurable resin or the electron beam-curable resin to polymerize at least a surface layer and thereafter irradiating an electron beam to polymerize a deep part and curing the entire photocurable resin or the electron beam-curable resin.

2. A curing system that cures photocurable resin or electron beam-curable resin not containing a photopolymerization initiator, the curing system comprising:
   a light source that irradiates an ultraviolet ray on the photocurable resin or the electron beam-curable resin;
   oxygen-concentration reducing means for reducing oxygen concentration of an atmosphere in which an ultraviolet ray is irradiated on the photocurable resin or the electron beam-curable resin to predetermined concentration or less; and
   an electron-beam irradiating apparatus that irradiates an electron beam on the photocurable resin or the electron beam-curable resin in a state in which at least a surface layer is polymerized by the irradiation of the ultraviolet ray.

3. The curing system according to claim 2, further comprising discharging means for discharging ink including the photocurable resin or the electron beam-curable resin added with a pigment, wherein
   the light source irradiates the ultraviolet ray on the ink discharged by the discharging means and cures the ink.

4. A curing system that cures photocurable resin or electron beam-curable resin not containing a photopolymerization initiator, the curing system comprising:
   a light source that irradiates an ultraviolet ray on the photocurable resin or the electron beam-curable resin;
   oxygen-concentration reducing means for reducing oxygen concentration of an atmosphere in which an ultraviolet ray is irradiated on the photocurable resin or the electron beam-curable resin to predetermined concentration or less; and
   a negative plate to which ink containing the photocurable resin or the electron beam-curable resin is applied, wherein the light source irradiates the ultraviolet ray on the ink applied to the negative plate and transferred to work and cures the ink.

5. The curing system according to claim 4, further comprising an electron-beam irradiating apparatus that irradiates an electron beam on the photocurable resin or the electron beam-curable resin in a state in which at least a surface layer is polymerized by the irradiation of the ultraviolet ray.

6. The curing system according to claim 4, wherein the negative plate is a planographic plate.

7. The curing system according to claim 4, wherein the negative plate is a relief printing plate.

8. The curing system according to claim 4, wherein the negative plate is an intaglio printing plate.

* * * * *